[12] United States Patent
Raju et al.

(10) Patent No.: US 11,475,148 B2
(45) Date of Patent: Oct. 18, 2022

(54) SYSTEM AND METHOD FOR PROVIDING LIMITED UTILIZATION RUN TIME APPLICATION CONTROL AS A SERVICE IN MICROCONTROLLERS

(71) Applicant: TEXAS INSTRUMENTS INCORPORATED, Dallas, TX (US)

(72) Inventors: Veeramanikandan Raju, Bengaluru (IN); Jonathan William Nafziger, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 55 days.

(21) Appl. No.: 16/419,753

(22) Filed: May 22, 2019

(65) Prior Publication Data
US 2020/0372164 A1  Nov. 26, 2020

(51) Int. Cl.
*G06F 21/00* (2013.01)
*G06F 21/62* (2013.01)

(52) U.S. Cl.
CPC .................. *G06F 21/6218* (2013.01)

(58) Field of Classification Search
CPC ................. G06F 21/62; G06F 21/6218
See application file for complete search history.

(56) References Cited

U.S. PATENT DOCUMENTS

| | | | |
|---|---|---|---|
| 10,257,052 B1 | 4/2019 | Lonborg et al. | |
| 2004/0181673 A1 | 9/2004 | Lin et al. | |
| 2006/0155904 A1* | 7/2006 | Murakami | G06F 13/1663 710/240 |
| 2007/0250906 A1* | 10/2007 | Hattori | H04M 1/675 726/2 |
| 2014/0137271 A1 | 5/2014 | Hyde | |
| 2014/0181913 A1 | 6/2014 | Kling et al. | |
| 2017/0316222 A1* | 11/2017 | Muhlestein | G06F 21/6218 |
| 2018/0357184 A1* | 12/2018 | Arora | G06F 12/1441 |
| 2019/0266037 A1* | 8/2019 | Shah | G06F 13/24 |

FOREIGN PATENT DOCUMENTS

RU      2239244 C2   10/2004
WO   WO2008094452 A2   8/2008

OTHER PUBLICATIONS

PCT International Search Report; PCT/US 2020/033402; dated Aug. 6, 2020; 2 pages.

* cited by examiner

*Primary Examiner* — Joseph P Hirl
*Assistant Examiner* — Chi D Nguy
(74) *Attorney, Agent, or Firm* — Krista Y. Chan; Charles A. Brill; Frank D. Cimino

(57) ABSTRACT

An apparatus includes a memory device and a microcontroller device integrated with the memory device. The microcontroller device is adapted to be communicatively coupled to a processor device and is configured to manage access by the processor device to data stored on the memory device. Managing access by the processor device to the data stored on the memory device includes setting an access permission for controlled data stored by the memory device based on authorization data stored in the memory device. Managing access by the processor device further includes receiving, from the processor device, a request to access the controlled data. Managing access by the processor device further includes determining whether to initiate access to the controlled data by the processor device based on the access permission.

17 Claims, 10 Drawing Sheets

SYSTEM AND METHOD FOR PROVIDING LIMITED UTILIZATION RUN TIME APPLICATION CONTROL AS A SERVICE IN MICROCONTROLLERS

BACKGROUND

Computing devices are used for many useful tasks from weather forecasting to entertainment. Many such tasks are performed by a processor device executing code stored on a memory device and/or accessing other data stored on such a memory device. Developers of useful computing products e.g., computer programs, media files, etc.) may be unable to efficiently monetize their creations because once a computing product is stored on a memory device, a processor device communicatively coupled to the memory device may have unlimited access to the computing product.

SUMMARY

According to the disclosure, an apparatus includes a microcontroller that is integrated with a memory device and adapted to be communicatively coupled to a processor device. The microcontroller controls processor access to the memory device. The microcontroller sets access permissions for controlled data stored in the memory device based on authorization data that is also stored in the memory device. The microcontroller responds to memory access requests from the processor based on these access permissions. The authorization data includes an entry for each controlled data item. Each entry in the authorization data includes a data identifier (e.g., a memory address) of the corresponding controlled data item and a usage log. The usage log indicates restrictions associated with the controlled data item. For example, the access log may store a count of accesses to the controlled data and a maximum allowed number of accesses or the usage log may store an elapsed access time (e.g., associated with access to the controlled data) and a granted access duration. Thus, the microcontroller may enforce time based and/or access count based restrictions on controlled data. Because the processor accesses the memory device through the microcontroller rather than directly, software executed on the processor may be prevented from circumventing the restrictions. Thus, developers of computing products may be able to more efficiently set access controls to their products. Accordingly, developers may be more able to efficiently monetize access to their products.

An apparatus includes a memory device and a microcontroller device integrated with the memory device. The microcontroller device is adapted to be communicatively coupled to a processor device and is configured to manage access by the processor device to data stored on the memory device. Managing access by the processor device to the data stored on the memory device includes setting an access permission for controlled data stored by the memory device based on authorization data stored in the memory device. Managing access by the processor device further includes receiving, from the processor device, a request to access the controlled data. Managing access by the processor device further includes determining whether to initiate access to the controlled data by the processor device based on the access permission.

A method includes managing, at a microcontroller device integrated into a memory device, access by a processor device to data stored on the memory device. Managing access by the processor device to the data stored on the memory device includes setting an access permission for controlled data stored by the memory device based on authorization data stored in the memory device. Managing access by the processor device to the data stored on the memory device further includes receiving, from the processor device, a request to access the controlled data. Managing access by the processor device to the data stored on the memory device further includes determining whether to initiate access to the controlled data by the processor device based on the access permission.

A computer readable storage device stores instructions executable by one or more processors to manage, at a microcontroller device integrated into a memory device, access by a processor device to data stored on the memory device. Managing access by the processor device to the data stored on the memory device includes setting an access permission for controlled data stored by the memory device based on authorization data stored in the memory device. Managing access by the processor device to the data stored on the memory device further includes receiving, from the processor device, a request to access the controlled data. Managing access by the processor device to the data stored on the memory device further includes determining whether to initiate access to the controlled data by the processor device based on the access permission.

BRIEF DESCRIPTION OF THE DRAWINGS

For a detailed description of various examples, reference will now be made to the accompanying drawings in which.

DETAILED DESCRIPTION

Figure 1:
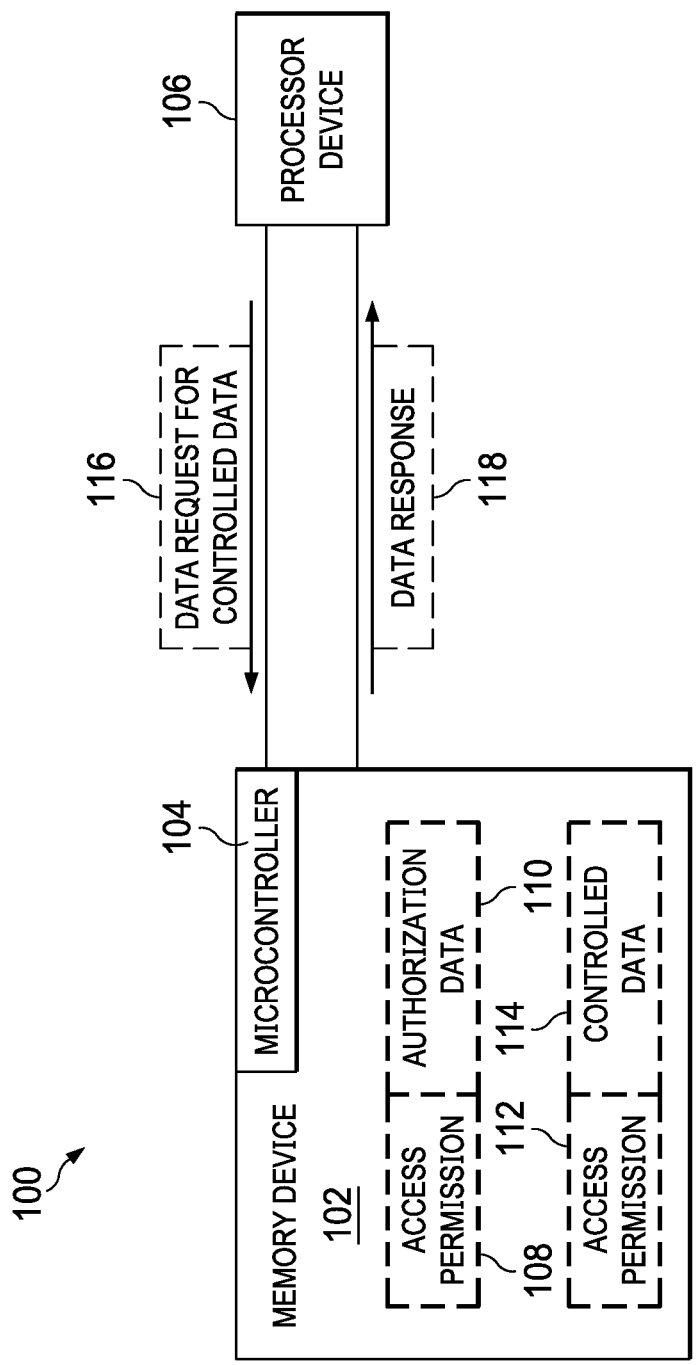
FIG. 1 illustrates a system for controlling access to controlled data stored on a memory device.

Referring to FIG. 1, a system 100 for limiting access to data on a memory device is shown. The system 100 includes a memory device 102 and a processor device 106. The memory device 102 may correspond to a flash memory device, a hard disk drive, another type of memory device, or a combination thereof. The processor device 106 may correspond to a central processor unit (CPU) or to another type of device.

Figure 11:
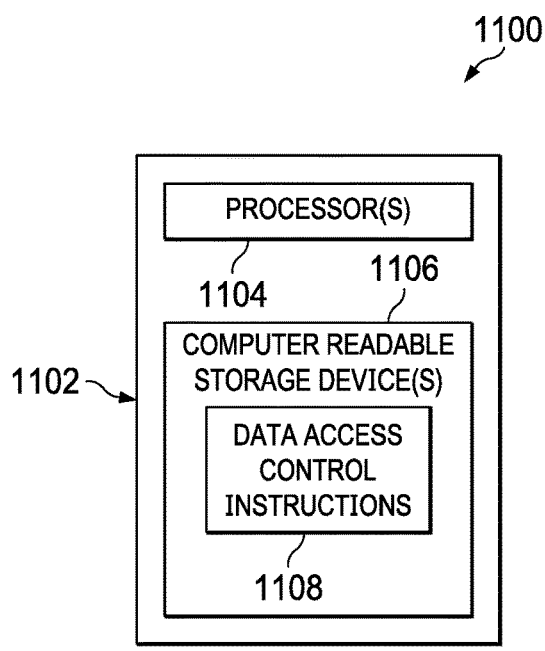
FIG. 11 is a block diagram of a computing device that may be integrated into a memory device to control access to controlled data stored on the memory device.

A microcontroller 104 is integrated into the memory device 102. The microcontroller 104 includes one or more CPU cores and memory (e.g., random access memory) storing instructions executable by the one or more CPU cores of the microcontroller 104 to control access to the memory device 102 as described herein. FIG. 11, described further below, depicts an example of a microcontroller, such as the microcontroller 104. The microcontroller 104 is configured to communicatively couple to one or more processor devices that utilize the memory device 102 and to control access to the memory device 102 by any such processor devices. Because the microcontroller 104 embedded in the memory device 102 is configured to receive all requests for access to the memory device 102 from processor devices that utilize the memory device 102 and because the memory of the microcontroller device 102 is inaccessible to those processor devices, those processor devices (e.g., programs executing on those processor devices) may be prevented from circumventing data access restrictions enforced by the microcontroller 104. Accordingly, a user may be unable to circumvent the data access restrictions by executing hacking software on a processor that has access to the memory device 102. In the illustrated example, the processor device 106 is coupled to the microcontroller 104 and to the memory device 102. While one processor device is illustrated, in other examples, the microcontroller 104 controls access by multiple processors to the memory device 102. As illustrated, the processor device 106 is coupled to the microcontroller 104 and to the memory device 102.

The microcontroller 104 is configured to expose an application programming interface (API) that supports one or more memory access commands to the processor device 106. The processor device 106 is configured to use the API to issue memory access requests to the microcontroller 104. Such access requests may correspond to read requests or write requests. The microcontroller 104 is configured to receive the access requests and to initiate or deny access to data stored on the memory device 102 responsive to the access requests based on one or more access permissions associated with the data. Further, the microcontroller 104 is configured to manage access permissions associated with controlled data based on authorization data. Example authorization data may indicate one or more time based restrictions, one or more use count restrictions, one or more other types of restrictions, or a combination thereof. As used herein, controlled data refers to data for which the microcontroller 104 manages one or more access permissions based on stored authorization data. In some implementations, access permissions that may be assigned to controlled data may be limited to execute only access and no access. In contrast general data stored by the memory device 102 and/or general data areas of the memory device 102 may be associated with a read and write access permission. The processor device 106 may include an execute-only mechanism that prevents the processor device 106 from copying data while activated. The microcontroller 104 may initiate activation of the execute-only mechanism in conjunction with initiating access to data associated with and execute only access permission.

The processor device 106 is unable to issue memory access requests directly to the memory device 102. For example, wordline and/or bitline selection inputs to the memory device 102 may be physically connected to the microcontroller 104 such that the processor device 106 cannot cause these lines to be driven without signaling the microcontroller 104 through the API. Thus, the coupling between the processor device 106 and the memory device 102 illustrated in FIG. 1 may be limited to the processor device 106 receiving data output by the memory device 102. In some implementations, all couplings between the processor device 106 and the memory device 102 are established through the microcontroller 104. Because the processor device 106 transmits all memory access requests to the microcontroller 104, software executed by the processor device 106 may be prevented from circumventing access controls imposed by the microcontroller 104.

In the illustrated example, the memory device 102 stores authorization data 110 that has an associated first access permission 108. The authorization data 110 identifies controlled data 114 stored by the memory device 102. For example, the authorization data 110 may include a memory address of the controlled data 114, a size of the controlled data 114, or a combination thereof. The controlled data 114 is associated with a second access permission 112 and the authorization data 110 indicates one or more restrictions based on which the microcontroller 104 manages the second access permission 112.

In particular examples, the first access permission 108 may correspond to a no access permission. Accordingly, the microcontroller 104 may decline any request by the processor device 106 to access the authorization data 110. This may prevent the processor device 106 from tampering with the authorization data 110.

In the illustrated example, the processor device 106 transmits a data request 116 for the controlled data 114 to the microcontroller 104 according to the API exposed by the microcontroller 104. In response to the data request 116, the microcontroller 104 determines whether to initiate access to the controlled data 114 based on the access permission 112. In some implementations, the microcontroller 104 may further determine, based on the authorization data 110, whether to update the access permission 112 in response to the data request 116 and prior to determining whether to initiate access.

Once the microcontroller 104 determines whether to initiate access to the controlled data 114, the microcontroller 104 initiates output of a data response 118 based on the determination. The data response 118 may correspond to one or more signals output by the memory device 102 or by the microcontroller 104. For example, in response to the data request 116 corresponding to a read request and a determination that the second access permission 112 indicates an execute only permission, the microcontroller 104 may cause the memory device 102 to output the controlled data 114 as the data response 118. In addition, the microcontroller 104 may signal the execute-only mechanism of the processor device 106 to prevent the processor device 106 from copying the controlled data 114. As another example, in response to the data request 116 corresponding to a write request and a determination that the second access permission 112 indicates an execute-only permission, the microcontroller 104 may cause the memory device 102 to output an error message as the data response 118. As another example, in response to a determination that the second access permission 112 indicates a no access permission, the microcontroller 104 may cause the memory device 102 to output an error message as the data response 118.

Thus, the microcontroller 104 may control access by the processor device 106 to the controlled data 114 based on the second access permission 112. As explained further below, the microcontroller 104 further manages the second access permission 112 based on the authorization data 110. Accordingly, restrictions on access to the controlled data 114 may be enforced and a creator of the controlled data 114 may more efficiently monetize access to the controlled data 114.

In some implementations, the authorization data 110, the controlled data 114, the first access permission 108, or a combination thereof are set by an original equipment manufacturer of the memory device 102. In some implementations, one or more of the authorization data 110, the controlled data 114, the first access permission 108, or a combination thereof may be set or updated during a hardware boot process of a device including the memory device 102. For example, certain commands of the API of the microcontroller 104 may only be operable during a boot sequence. In some implementations, certain commands of the API require a password or other type of authentication method to function.

In an illustrative example, the memory device 102 corresponds to flash memory included in a personal computing device and the processor device 106 corresponds to a general processor of the personal computing device. In order to access data stored on the memory device 102, the processor device 106 issues requests using the API of the microcontroller 104. The microcontroller 104 controls access to the memory device 102 based on instructions stored in the memory of the microcontroller 104 and based on the access permissions 108, 112 and the authorization data 110. The processor device 106 may be incapable of accessing the memory device 102 directly (e.g., without issuing a request to the microcontroller 104) and may not be able to alter the memory of the microcontroller 104. Accordingly, a user of the personal computing device may not be able to circumvent access restrictions imposed by the microcontroller 104 on data stored in the memory device 102 using software (e.g., hacking tools) executed by the processor device 106.

Figure 2:
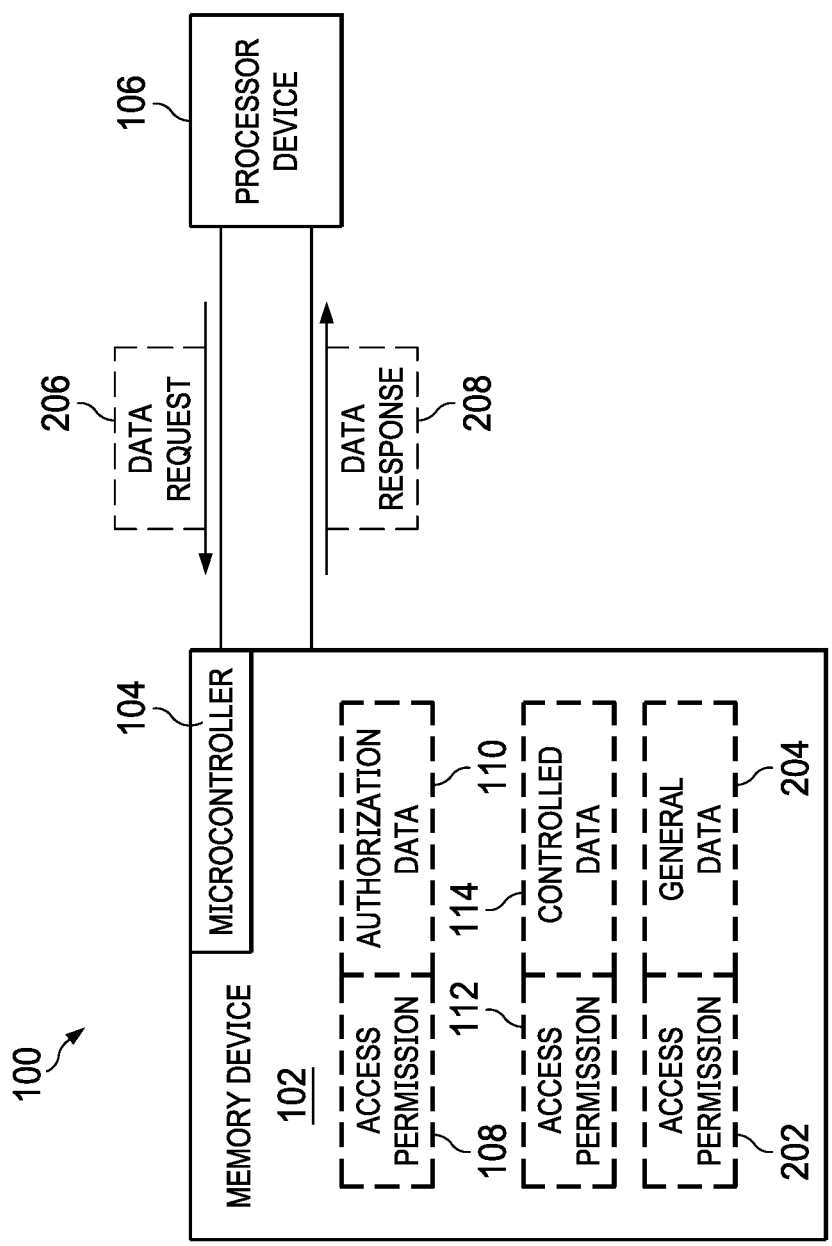
FIG. 2 illustrates an example in which the memory device further stores general data

In some implementations, general data is stored by the memory device 102 in addition to the controlled data 114. FIG. 2 illustrates an example of the system 100 in which the memory device 102 stores general data 204. The general data 204 is associated with a third access permission 202 that is independent of the authorization data 110. In some implementations, the third access permission 202 may be set by the microcontroller 104 based on commands received from the processor device 106. In the illustrated example, the processor device 106 transmits a data request 206 to the microcontroller 104. The microcontroller 104 then initiates a data response 208 in response to the data request 206.

In examples in which the data request 206 identifies the authorization data 110, the microcontroller 104 initiates the data response 208 based on the first access permission 108. For example, the microcontroller 104 may cause the memory device 102 to output an error message in response to determining that the first access permission 108 indicates no access.

In examples in which the data request 206 identifies the controlled data 114, the microcontroller 104 initiates the data response 208 based on the second access permission 112. For example, the microcontroller 104 may cause the memory device 102 to output an error message in response to determining that the second access permission 112 indicates a no access permission. Alternatively, the microcontroller 104 may cause the memory device 102 to output an error message in response to the data request 206 corresponding to a write request and a determination that the second access permission 112 indicates an execute only permission. Alternatively, the microcontroller 104 may cause the memory device 102 to output the controlled data 114 in response to the data request 206 corresponding to a read request and a determination that the second access permission 112 indicates execute-only access. Further, the microcontroller 104 may initiate activation of the execute-only mechanism of the processor device 106 in response to the determination that the second access permission 112 indicates execute-only access.

In examples in which the data request 206 identifies the general data 204, the microcontroller 104 initiates the data response 208 based on the third access permission 202. For example, the microcontroller 104 may cause the memory device 102 to output an error message in response to determining that the third access permission 202 indicates a no access permission. Alternatively, the microcontroller 104 may cause the memory device 102 to output an error message in response to the data request 206 corresponding to a write request and a determination that the third access permission 202 indicates an execute only permission. Alternatively, the microcontroller 104 may cause the memory device 102 to output the general data 204 in response to the data request 206 corresponding to a read request and a determination that the third access permission 202 indicates execute-only access. Further, the microcontroller 104 may initiate activation of the execute-only mechanism of the processor device 106 in response to the determination that the third access permission 202 indicates execute-only access. Alternatively, the microcontroller 104 may cause the memory device 102 to output the general data 204 in response to the data request 206 corresponding to a read request and a determination that the third access permission 202 indicates read write access. Alternatively, the microcontroller 104 may cause the memory device 102 to store data indicated by the data request 206 in the general data 204 in response to the data request 206 corresponding to a write request and a determination that the third access permission 202 indicates read write access. In such examples, the data response 208 may correspond to a write confirmation message or signal.

Thus, FIG. 2 illustrates how the memory device 102 may support both controlled and general data. Accordingly, the system may be distributed for general use in storing general data while also including value added (e.g., controlled) data.

Figure 3:
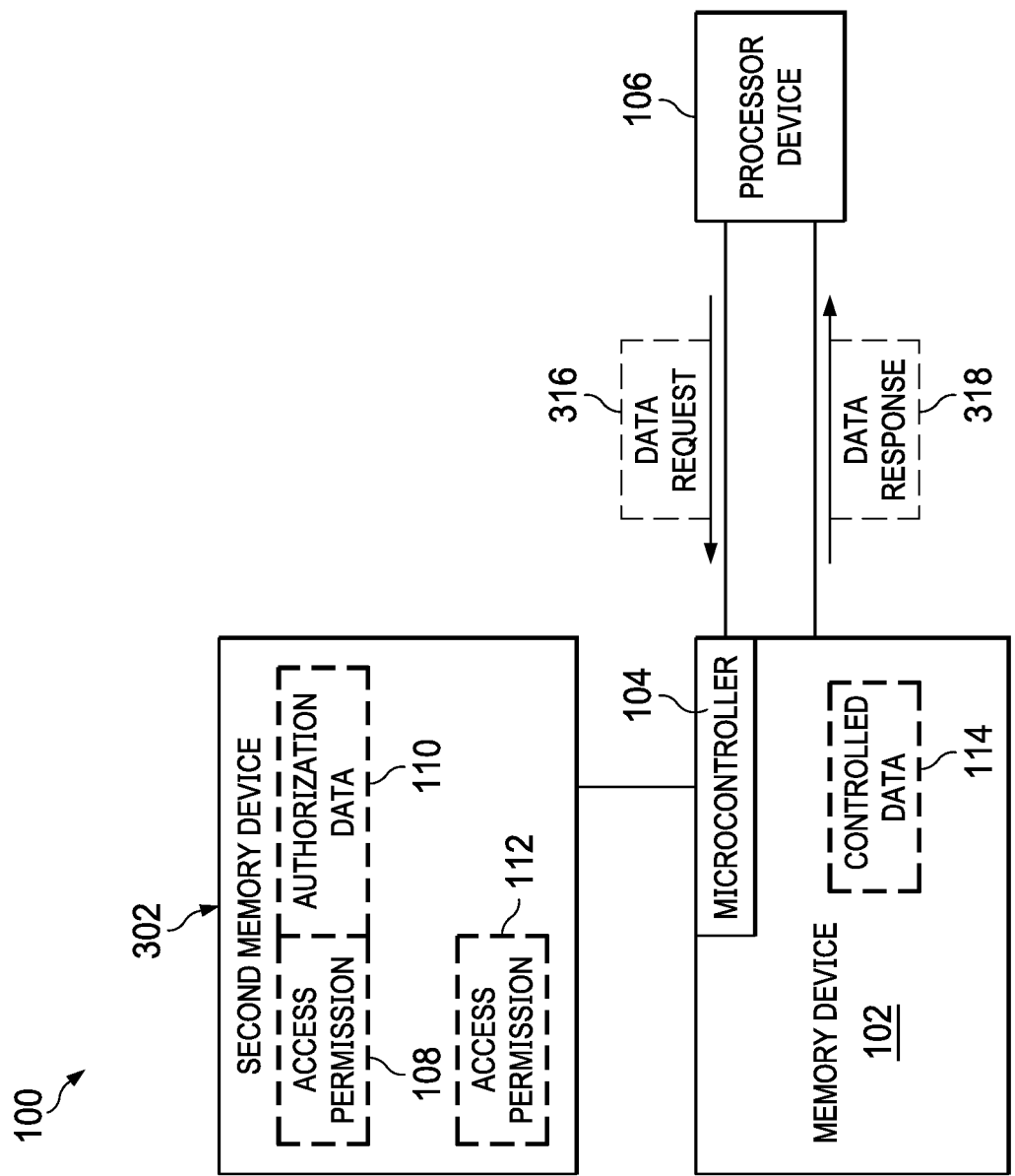
FIG. 3 illustrates an example in which access permissions and authorization data are stored on a second memory device distinct from the memory device.

In the examples described above, access permissions and authorization data are stored in the memory device 102 along with any associated data (either uncontrolled or controlled). However, in alternative implementations, access permissions and/or authorization data may be stored in a separate memory device. FIG. 3 illustrates an example in which access permissions and authorization data are stored in a separate memory device. In the illustrated example, the microcontroller 104 is communicatively coupled with a second memory device 302 that stores the first access permission 108, the authorization data 110, and the second access permission 112. The microcontroller 104 initiates a data response 318 in response to a data request 316 to access data stored on the memory device 102 based on data stored on the second memory device 302.

Figure 4:
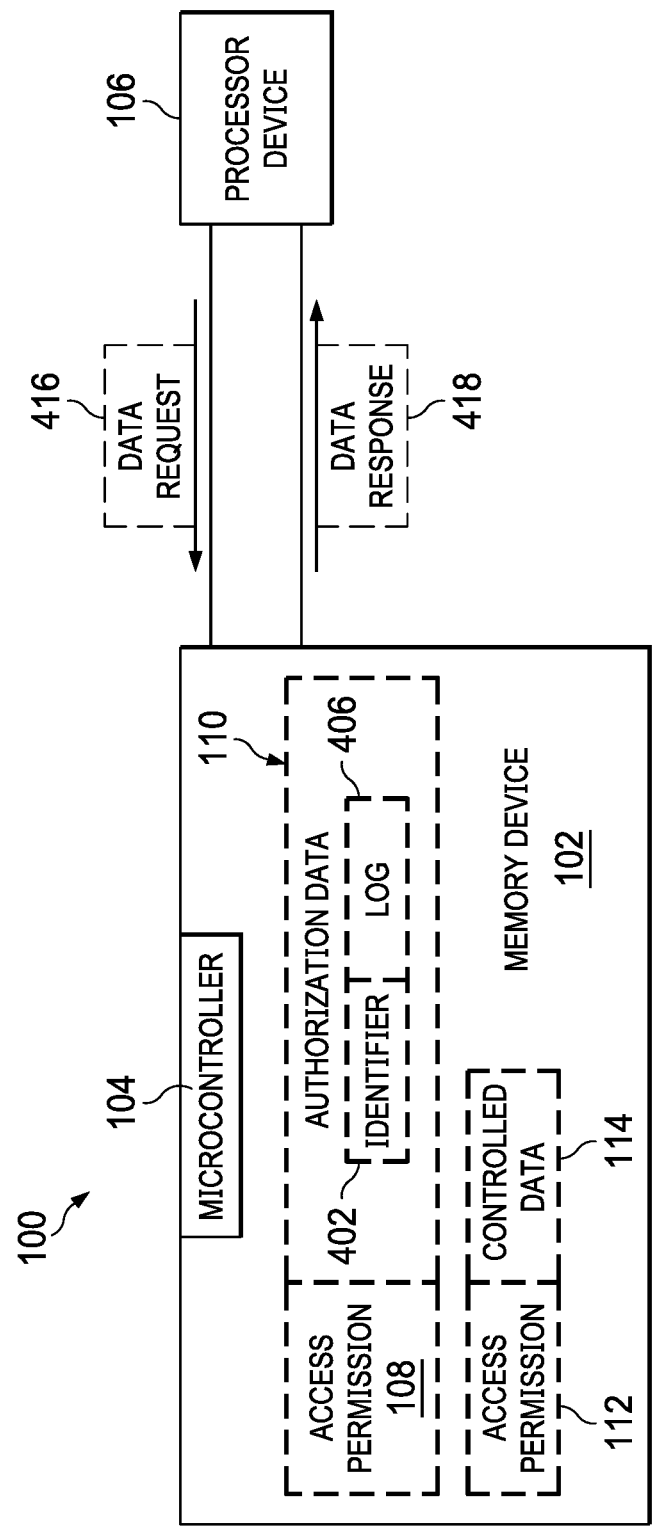
FIG. 4 illustrates an example of the system in which an example of authorization data is shown.

Referring now to FIG. 4, a diagram of the system 100 illustrating authorization data in more detail is shown. In the illustrated example of FIG. 4, the authorization data 110 includes an identifier 402 and a log 406. The identifier 402 identifies the controlled data 114. In some examples, the identifier 402 corresponds to a memory address of the controlled data 114, a size of the controlled data 114, or a combination thereof. The authorization data 110 further includes a log 406. The log 406 indicates one or more restrictions on use of the controlled data 114. Such restrictions may be time based, access count based, based on some other feature, or a combination thereof. In some implementations, the log 406 further includes an indicator of use of the controlled data 114, such as an access count or a duration of time the controlled data 114 has been used. For example, the log 406 may store a restriction indicating that the controlled data may be executed for 30 minutes and an indicator of how long the controlled data 114 has been executed. In some implementations, the indicator of use stored in the log 406 is periodically reset. For example, the indicator of how long the controlled data 114 has been executed may be reset once a day.

In the illustrated example, the processor device 106 sets the second access permission 112 based on the log 406. The microcontroller 104 updates the access permission periodically, upon receiving a data request for the controlled data 114, or upon updating the log 406 (e.g., the access count or the duration of time the controlled data 114 has been used). Further, the microcontroller 104 updates the log 406 based on accesses to the controlled data 114 (e.g., in real time). Thus, the microcontroller 104 enforces restrictions on access to the controlled data 114 stored in the log 406.

FIG. 4 further illustrates the processor device 106 transmitting a data request 416 for the controlled data 114 to the microcontroller 104 according to the API exposed by the microcontroller 104 and the microcontroller 104 initiating a data response 418.

Figure 5:
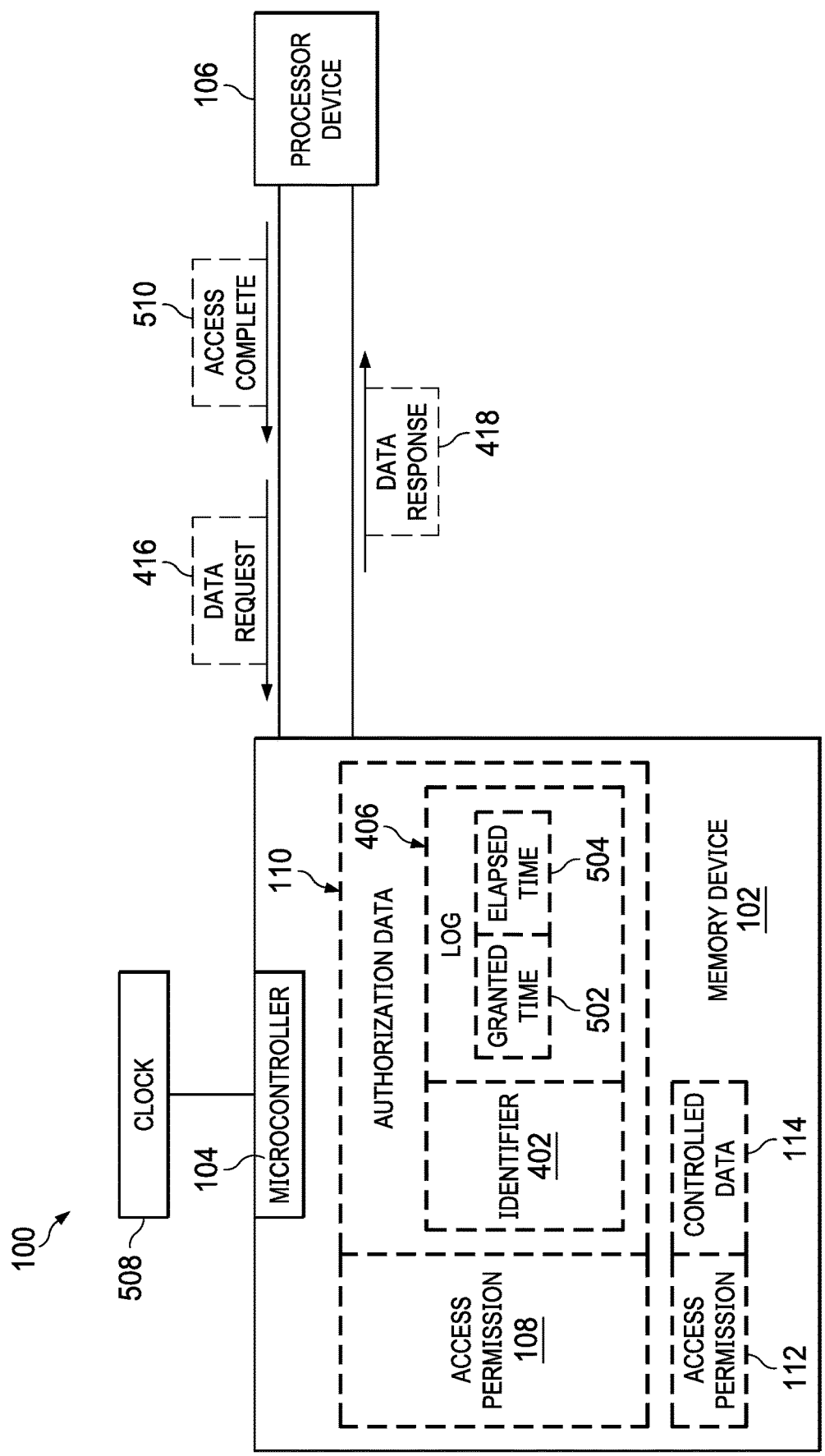
FIG. 5 illustrates an example of the system in which the authorization data includes time based restrictions associated with the controlled data.

Referring to FIG. 5 an example in which the restrictions stored in the log are time based is shown. In FIG. 5, the log 406 stores a granted time 502. The granted time 502 indicates a duration of time that the controlled data 114 is authorized to be executed. For example, the granted time 502 may indicate 30 minutes. The log 406 further includes an elapsed time 504 (e.g., an elapsed access duration). The elapsed time 504 indicates how long the controlled data 114 has been accessed by the processor device 106. The microcontroller 104 is configured to set the second access permission 112 based on a comparison of the granted time 502 to the elapsed time 504. For example, in response to determining that the granted time 502 is greater than the elapsed time 504, the microcontroller 104 may set the second access permission 112 to execute-only permission. As another example, in response to determining that the granted time 502 is less than or equal to the elapsed time 504, the microcontroller 104 may set the second access permission 112 to no access. In some implementations, the microcontroller 104 sets the access permission 112 periodically. For example, the microcontroller 104 may compare the granted time 502 to the elapsed time 504 every 10 minutes and set the second access permission 112 accordingly. In other implementations, the microcontroller 104 updates the second access permission 112 based on the log 406 responsive to data requests.

In the illustrated example, the system 100 includes a clock 508 coupled to the microcontroller 104. The microcontroller 104 is configured to measure time spent by the processor device 106 accessing the controlled data 114 based on a signal from the clock 508 and to update the elapsed time 504 accordingly. For example, the microcontroller 104 may receive the data request 416 for the controlled data 114. Based on the second access permission 112, the microcontroller 104 may initiate access to the controlled data 114. Once access to the controlled data 114 is initiated, the microcontroller 104 may further periodically increment the elapsed time 504 based on a signal from the clock 508 until the microcontroller 104 receives an access complete message 510 from the processor device 106 (or until the elapsed time 504 is greater than or equal to the granted time 502). In some implementations, the microcontroller 104 is configured to disable access to the controlled data 114 in response to determining that the elapsed time 504 and equals or exceeds the granted time 502 while the processor device 106 is accessing the controlled data 114. For example, the microcontroller 104 may set the second access permission 112 to no access and cause the memory device 102 to cease outputting the controlled data 114 and/or send one or more signals to the processor device 106 to cause the processor device 106 to cease use of the controlled data 114.

Thus, FIG. 5 illustrates an example in which the microcontroller 104 enforces time based access restrictions associated with data. Accordingly, value added content stored on the memory device 102 may be limited to a specific use duration. As described above, the microcontroller 104 may periodically reset use indicators, such as the elapsed time 504, stored in the log 406. Accordingly, the limited duration (e.g., 30 minutes) may correspond to a period (e.g., a day).

Figure 6:
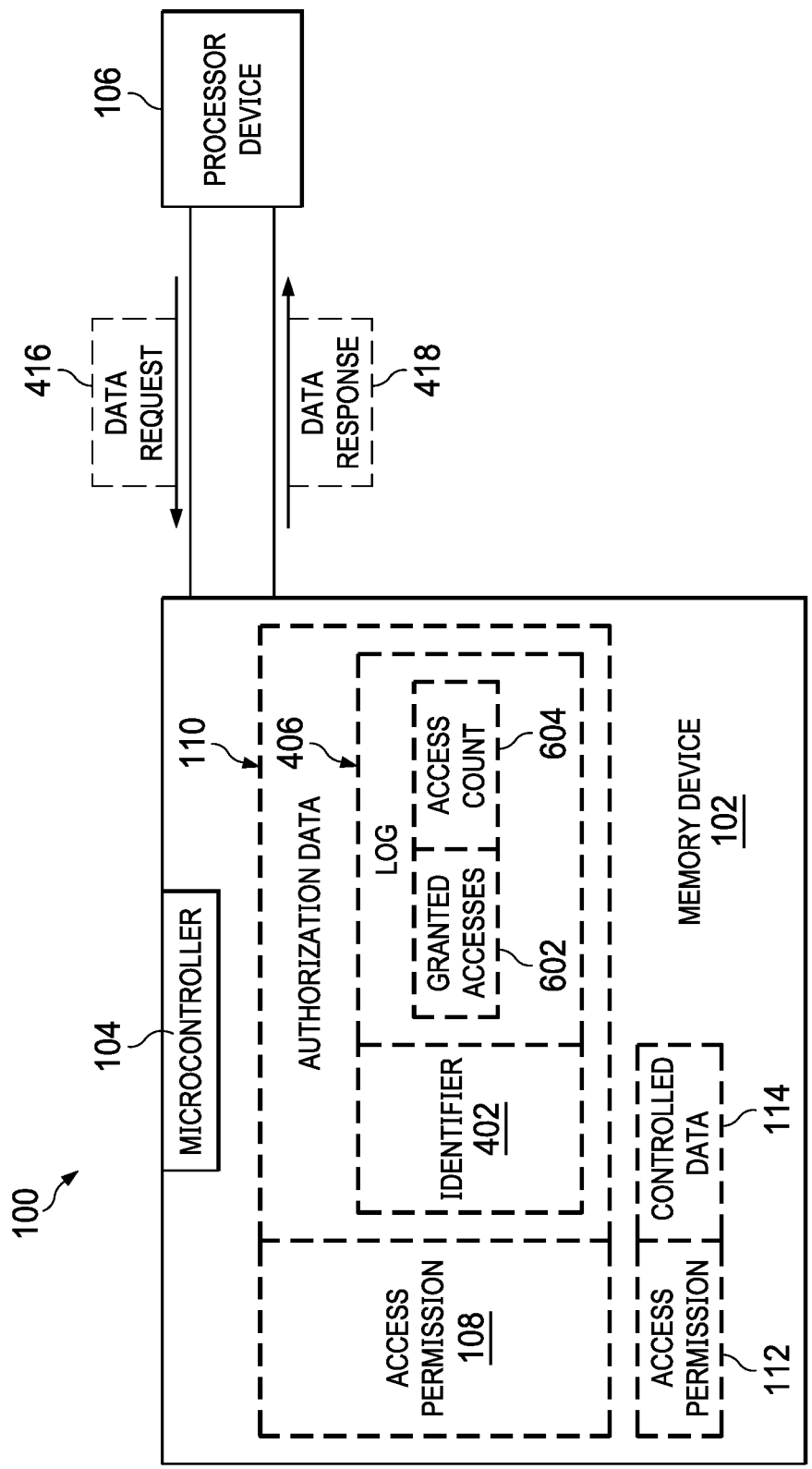
FIG. 6 illustrates an example of the system in which the authorization data includes access count based restrictions associated with the controlled data.

Referring to FIG. 6 an example in which the restrictions stored in the log are access count based is shown. In FIG. 6, the log 406 stores a number of granted accesses 602. The granted accesses 602 indicates a number of times that the processor device 106 is authorized to access the controlled data 114. For example, the granted accesses 602 may indicate 5 accesses. The log 406 further includes an access count 604. The access count 604 indicates a count of times the controlled data 114 has been accessed by the processor device 106. The microcontroller 104 is configured to set the second access permission 112 based on a comparison of granted accesses 602 to the access count 604. For example, in response to determining that the granted accesses 602 is greater than the access count 604, the microcontroller 104 may set the second access permission 112 to execute-only permission. As another example, in response to determining that the granted accesses 602 is less than or equal to the access count 604, the microcontroller 104 may set the second access permission 112 to no access. In some implementations, the microcontroller 104 sets the access permission 112 periodically. For example, the microcontroller 104 may compare the granted accesses 602 to the access count 604 every 10 minutes and set the second access permission 112 accordingly. In other implementations, the microcontroller 104 updates the second access permission 112 responsive to data requests.

In the illustrated example, the microcontroller 104 is configured to set the second access permission 112 based on a comparison of the granted accesses 602 to the access count 604. In response to receiving the data request 416, the microcontroller 104 is configured to determine whether to grant access to the controlled data 114 based on the second access permission 112. The microcontroller 104 is further configured to increment the access count 604 and update the second access permission 112 in response to a determination to initiate access to the controlled data 114.

Thus, FIG. 6 illustrates an example in which the microcontroller 104 enforces access count based access restrictions associated with data. Accordingly, value added content stored on the memory device 102 may be limited to a specific access count. As described above, the microcontroller 104 may periodically reset use indicators, such as the access count 604, stored in the log 406. Accordingly, the granted accesses 602 (e.g., 5 accesses) may correspond to a period (e.g., a day).

Figure 7:
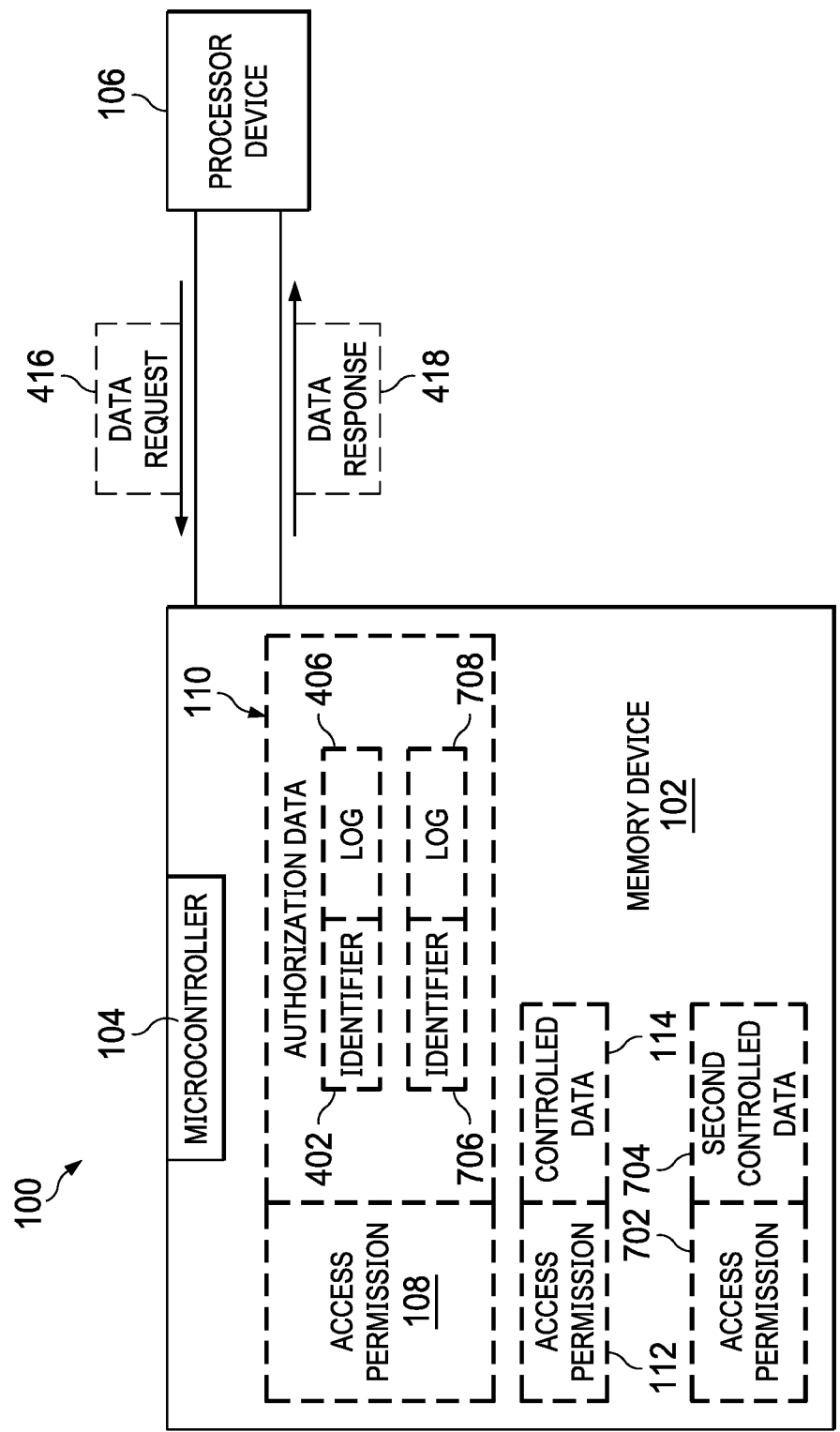
FIG. 7 illustrates an example of the system in which the memory device stores multiple controlled data items.

Referring to FIG. 7, an example of the system 100 is shown in which the memory device 102 stores multiple items of controlled data. In the illustrated example, the memory device 102 stores second controlled data 704 in addition to the controlled data 114. The second controlled data 704 is associated with a fourth access permission 702 set by the microcontroller 104 based on a second log 708 included in the authorization data 110. The second log 708 is associated with a second identifier 706 that indicates the second controlled data 704. In some implementations, the logs 406, 708 include different types of restrictions. For example, the log 406 may include time based restrictions associated with the controlled data 114 and the second log 708 may include access count based restrictions associated with the second controlled data 704.

Thus, FIG. 7 illustrates that the microcontroller 104 may control access to different items of controlled data. Further, the microcontroller 104 may control access to the different items of controlled data based on different types of restrictions. Accordingly, the memory device 102 may support a variety of use restrictions on data.

Figure 8:
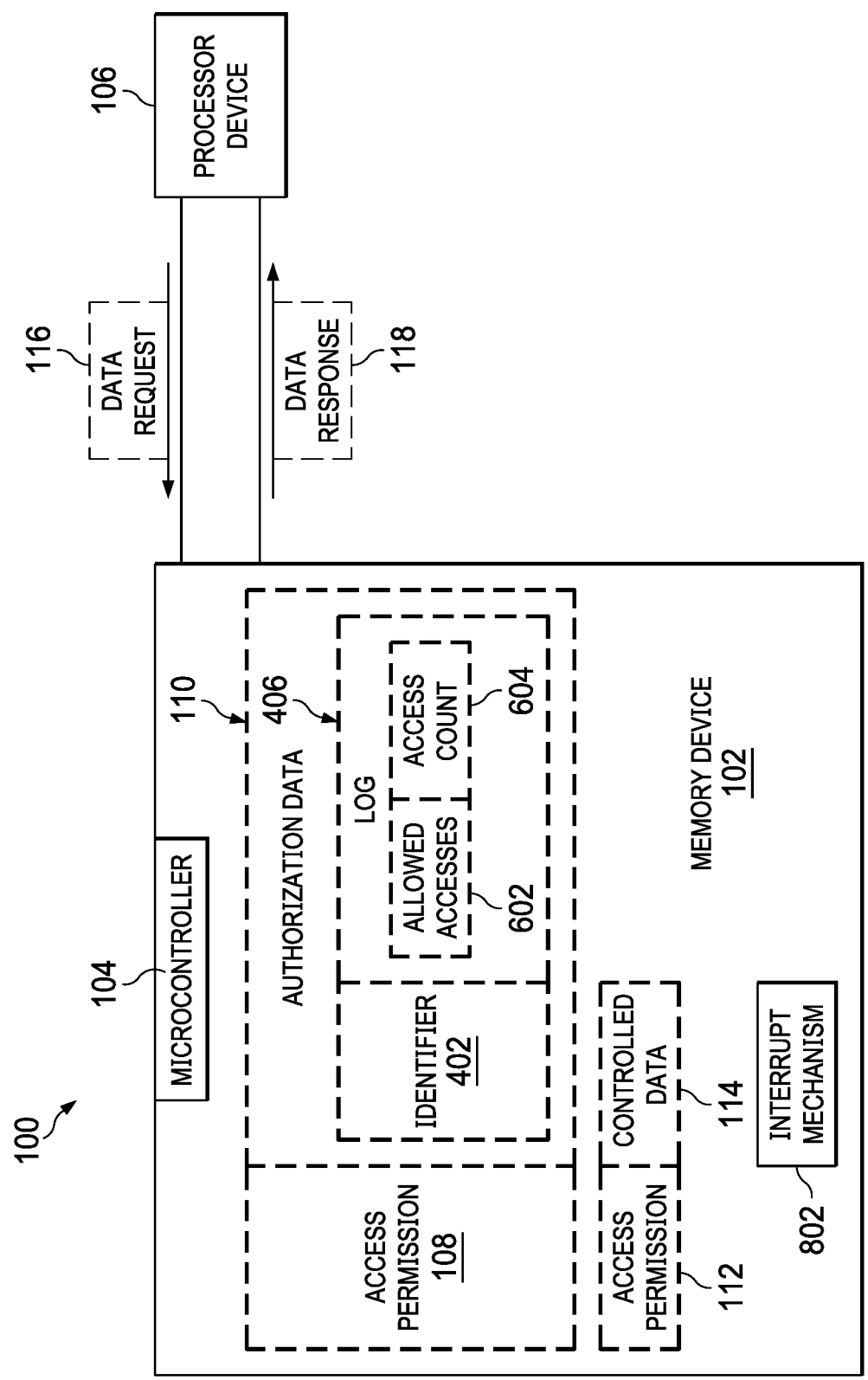
FIG. 8 illustrates an example of the system in which the memory device includes an interrupt mechanism.

Referring to FIG. 8, a diagram of the system 100 depicting the memory device 102 including an interrupt mechanism. In the illustrated example, the memory device 102 includes an interrupt mechanism 802. The interrupt mechanism 802 may correspond to a hardware interrupt mechanism or may correspond to software executed by the microcontroller 104. The interrupt mechanism 802 is configured to monitor for access to the controlled data 114. In response to detecting an access to the controlled data 114, the interrupt mechanism 802 may transmit a signal from to the microcontroller 104 to cause the microcontroller 104 to increment the access count 604 and re-compute the access permission 112. Thus, FIG. 8 illustrates a mechanism for notifying the microcontroller 104 that controlled data 114 has been accessed. In alternative examples, the microcontroller 104 monitors requests from the processor device 106 do determine that the controlled data is accessed.

Figure 9:
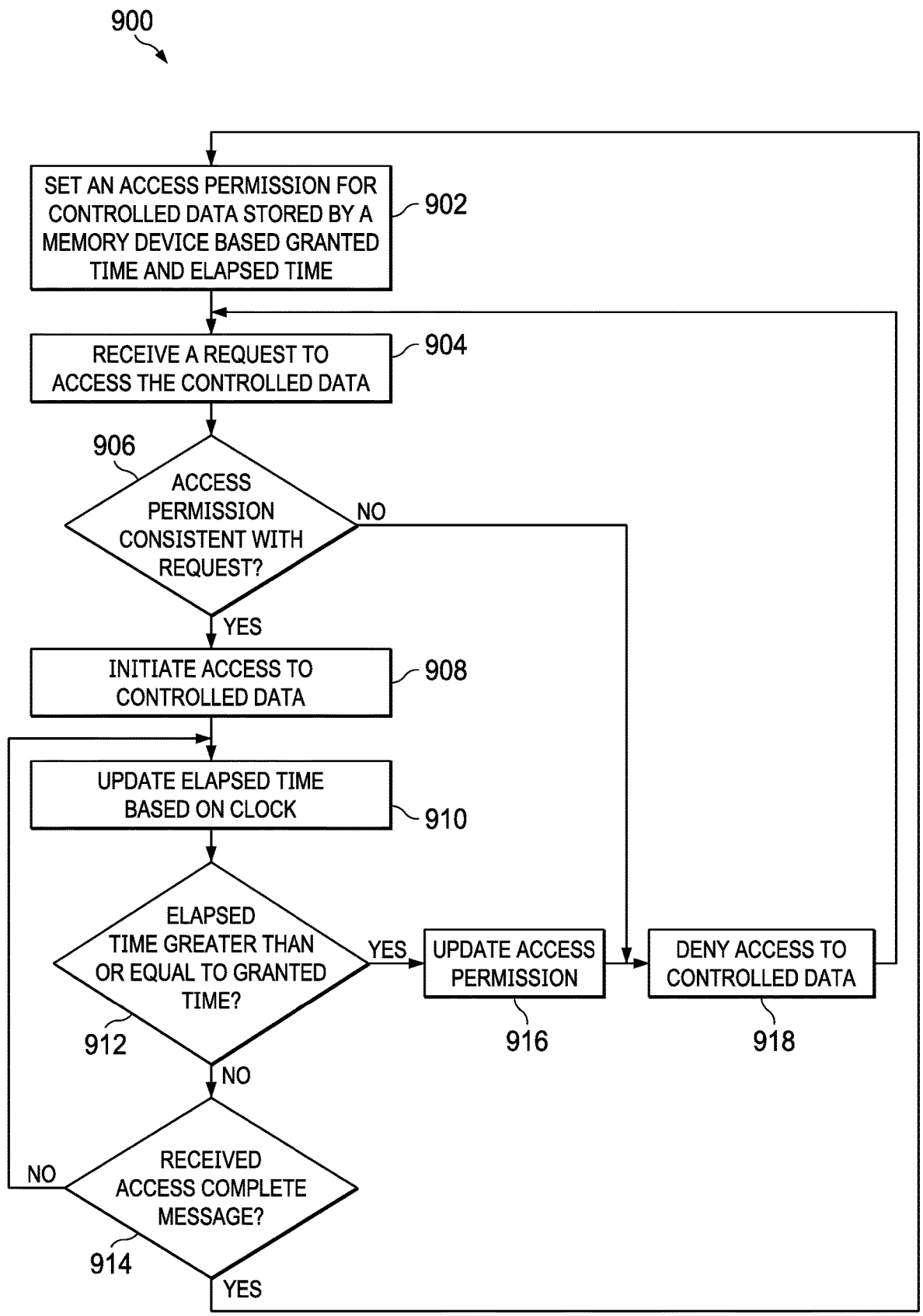
FIG. 9 illustrates a method for controlling access to controlled data stored on a memory device based on access time.

Referring to FIG. 9, a flowchart illustrating a method 900 of controlling access to data is shown. The method 900 may be performed by a microcontroller integrated with a memory device, such as the microcontroller 104. The method 900 includes setting an access permission for controlled data stored by a memory device based on a granted time and an elapsed time, at 902. For example, the microcontroller 104 may compare the granted time 502 to the elapsed time 504 included in the authorization data 110 and set the second access permission 112 based on a result of the comparison. To illustrate, the microcontroller 104 may set the second access permission 112 to execute-only permission in response to determining that the granted time 502 is greater than the elapsed time 504 or may set the second access permission 112 to no access permission in response to determining that the granted time 502 is less than or equal to the elapsed time 504.

The method 900 further includes receiving a request to access the controlled data, at 904. For example, the microcontroller 104 may receive the data request 416 to access the controlled data 114 from the processor device 106.

The method 900 further includes determining whether the access permission is consistent with the request, at 906. For example, the microcontroller 104 may determine whether the operation (e.g., read, write, execute) specified by the data request 416 is allowed for the controlled data 114 based on the second access permission 112.

In response to determining that the request is not consistent with the access permission, the method 900 includes denying access to the controlled data, at 918, and continuing to monitor for access requests. For example, in response to the data request 416 indicating a write request and the second access permission 112 indicating execute-only permission, the microcontroller 104 may generate the data response 418 indicating that the write request is rejected and may continue monitoring for data requests. As another example, in response to determining that the data request 416 identifies a read request for the controlled data 114 and the second access permission 112 indicates no access permission, the microcontroller 104 may generate the data response 418 indicating that the read request is rejected and may continue monitoring for data requests.

In response to determining that the request is consistent with the access permission, the method 900 includes initiating access to the controlled data, at 908. For example, in response to the data request 416 indicating a read request and the second access permission 112 indicating execute-only permission, the microcontroller 104 may generate the data response 418 including the controlled data 114. In addition, the microcontroller 104 may signal an execute-only mechanism of the processor device 106 to prevent the processor device 106 from copying the controlled data 114.

The method 900 further includes updating the elapsed time based on a clock, at 910. For example, the microcontroller 104 may periodically update the elapsed time 504 based on a signal from the clock 508 while the controlled data 114 is accessed by the processor device 106.

The method 900 further includes determining whether the elapsed time is greater than or equal to the granted time, at 912. For example, the microcontroller 104 may periodically determine whether the elapsed time 504 has exceeded the granted time 502 while the controlled data 114 is accessed by the processor device 106.

In response to determining that the elapsed time is greater than or equal to the granted time, the method 900 includes updating the access permission, at 916, and denying access to the controlled data, at 918. For example, in response to determining that elapsed time 504 is equal to or exceeds the granted time 502, the microcontroller 104 may set the second access permission 112 to no access permission. Further, the microcontroller 104 may signal the processor device 106 to cease using the controlled data 114 or otherwise disable access to the controlled data 114. In alternative examples, the method 900 may include allowing the processor device 106 to finish using the controlled data 114 but disallowing future uses.

In response to determining that the elapsed time is less than the granted time, the method 900 includes determining whether an access complete message has been received, at 914. If no access complete message has been received, the method 900 includes continuing to update the elapsed time based on the clock, at 910. If an access complete message has been received, the method 900 includes setting the access permission for the controlled data stored by the memory device based on the granted time and the elapsed time, at 902. For example, the microcontroller 104 may continue updating the elapsed time 504 until the access complete message 510 is received from the processor device 106. In response to receiving the access complete message 510, the microcontroller 104 may cease updating the elapsed time 504 and re-compute the second access permission 112 based on the granted time 502 and the elapsed time 504.

Thus, FIG. 9 illustrates an example of a method that may be used by a microcontroller to enforce time based access restrictions for data. Because the method may be performed by a microcontroller integrated with a memory device, a processor device accessing the memory device may be prevented from circumventing the access restrictions.

Figure 10:
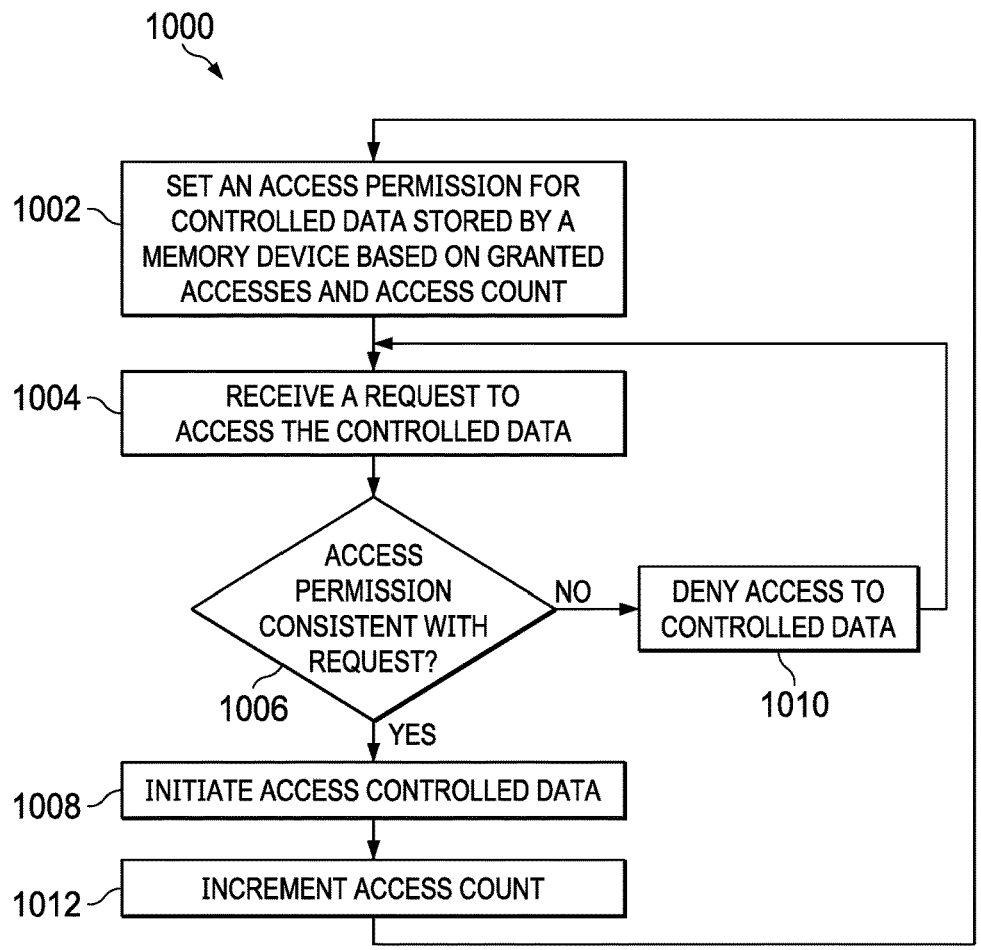
FIG. 10 illustrates a method for controlling access to controlled data stored on a memory device based on access count.

Referring to FIG. 10, a flowchart illustrating a method 1000 of controlling access to data is shown. The method 1000 may be performed by a microcontroller integrated with a memory device, such as the microcontroller 104. The method 1000 includes setting an access permission for controlled data stored by a memory device based on a number of granted accesses and an access count, at 1002. For example, the microcontroller 104 may compare the granted accesses 602 to the access count 604 included in the authorization data 110 and set the second access permission 112 based on a result of the comparison. To illustrate, the microcontroller 104 may set the second access permission 112 to execute-only permission in response to determining that the granted accesses 602 is greater than the access count 604 or may set the second access permission 112 to no access permission in response to determining that the granted accesses 602 is less than or equal to the access count 604.

The method 1000 further includes receiving a request to access the controlled data, at 1004. For example, the microcontroller 104 may receive the data request 416 to access the controlled data 114 from the processor device 106.

The method 1000 further includes determining whether the access permission is consistent with the request, at 1006. For example, the microcontroller 104 may determine whether the operation (e.g., read, write, execute) specified by the data request 416 is allowed for the controlled data 114 based on the second access permission 112.

In response to determining that the request is not consistent with the access permission, the method 1000 includes denying access to the controlled data, at 1010, and continuing to monitor for access requests. For example, in response to the data request 416 indicating a write request and the second access permission 112 indicating execute-only permission, the microcontroller 104 may generate the data response 418 indicating that the write request is rejected and may continue monitoring for data requests. As another example, in response to determining that the data request 416 identifies a read request for the controlled data 114 and the second access permission 112 indicates no access permission, the microcontroller 104 may generate the data response 418 indicating that the read request is rejected and may continue monitoring for data requests.

In response to determining that the request is consistent with the access permission, the method 1000 includes initiating access to the controlled data, at 1008. For example, in response to the data request 416 indicating a read request and the second access permission 112 indicating execute-only permission, the microcontroller 104 may generate the data response 418 including the controlled data 114. In addition, the microcontroller 104 may signal an execute-only mechanism of the processor device 106 to prevent the processor device 106 from copying the controlled data 114.

The method 1000 further includes incrementing the access count, at 1012, and re-computing the access permission, at 1002. For example, after initiating access to the controlled data 114 by the processor device 106, the microcontroller 104 may increment the access count 604 and compare the updated access count 604 to the granted accesses 602. If the updated access count 604 is equal to or exceeds the granted accesses 602, the microcontroller 104 may change the second access permission 112 to no access. In some implementations, the microcontroller 104 updates the access count 604 based on a signal received from the interrupt mechanism 802.

Thus, FIG. 10 illustrates an example of a method that may be used by a microcontroller to enforce access count based access restrictions for data. Because the method may be performed by a microcontroller integrated with a memory device, a processor device accessing the memory device may be prevented from circumventing the access restrictions.

It should be noted that microcontrollers integrated with memory devices may implement different methods to enforce access restrictions for controlled data. For example, in some implementations, a microcontroller (e.g., the microcontroller 104) may determine whether to initiate access to controlled data (e.g., the controlled data 114) by evaluating a restriction in response to a data request (e.g., the data request 416) rather than based on an access permission. For example, in response to receiving the data request 416, the microcontroller 104 may determine whether to initiate access to the controlled data 114 based on a comparison of the access count 604 to the granted accesses 602 or based on a comparison of the granted time 502 to the elapsed time 504.

Referring to FIG. 11 a block diagram of a computer system 1100 that may enforce access restrictions to controlled data is shown. The computer system 1100 includes a computing device 1102. The computing device 1102 may correspond to the microcontroller 104 and may be integrated with a memory device, such as the memory device 102. The computer system 1100 includes one or more processors 1104 and one or more computer readable storage devices 1106. The one or more processors 1104 may include one or more CPUs, one or more GPUs, one or more other processors, or a combination thereof. The one or more computer readable storage devices 1106 may include one or more read only memory (ROM) devices, one or more random access memory (RAM) devices, one or more disc drive devices, one or more other types of memory devices, or a combination thereof. The one or more computer readable storage devices 1106 store data access control instructions 1108 that are executable by the one or more processors 1104 to perform one or more of the functions described herein.

The one or more processors 1104 executing the instructions 1108 are configured to perform the operations described herein. For example, the one or more processors 1104 may receive and process data access requests from a processor device. The one or more processors 1104 may enforce access restrictions associated with controlled data according to the various techniques described herein.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. An apparatus comprising:
   a memory device; and
   a microcontroller device integrated with the memory device and configured to control access to the memory device by a processor device, the microcontroller device configured to:
   set an access permission for controlled data stored by the memory device based on authorization data stored in the memory device, the authorization data to indicate a number of authorized accesses the processor device is granted to the controlled data, a count of authorized accesses to the controlled data, and a granted access duration;

receive, from the processor device, a request to access the controlled data; and determine whether to initiate access to the controlled data by the processor device based on the access permission; and determine an elapsed access duration based on an indicator from a clock device indicating an elapsed time following an authorized access corresponding to the request, and prior to receipt of an access complete message corresponding to the request; and wherein the microcontroller is configured to set the access permission for the controlled data also based on a comparison of the elapsed access duration to the granted access duration.

2. The apparatus of claim 1, wherein managing access by the processor device to the controlled data stored on the memory device further includes setting the access permission for the controlled data based on a comparison of the number of granted accesses and the count of accesses.

3. The apparatus of claim 2, wherein the microcontroller device is further configured to:

initiate transmission of the controlled data to the processor device based on the access permission;

update the count of accesses in response to initiating transmission of the controlled data; and update the access permission based on the updated count.

4. The apparatus of claim 2, wherein the memory device further comprises a hardware interrupt mechanism configured to transmit a signal to the microcontroller device in response to access to the controlled data, wherein the microcontroller device is further configured to:

update the count of accesses in response to the signal; and update the access permission based on the updated count.

5. The apparatus of claim 1, wherein the microcontroller device is further configured to update the authorization data based on a signal received during a hardware boot process.

6. The apparatus of claim 1, wherein the memory device comprises a flash memory device.

7. A method comprising:

managing, at a microcontroller device integrated into a memory device, access by a processor device to data stored on the memory device, wherein managing access by the processor device to the data stored on the memory device includes:

setting an access permission for controlled data stored by the memory device based on authorization data stored in the memory device, the authorization data indicating a number of authorized accesses the processor device is granted to the controlled data, a count of authorized accesses to the controlled data, and a granted access duration;

receiving, from the processor device, a request to access the controlled data; and determining whether to initiate access to the controlled data by the processor device based on the access permission;

determining an elapsed access duration based on an indicator from a clock device that indicates an elapsed time following an authorized access corresponding to the request and prior to receipt of an access complete message corresponding to the request;

wherein setting the access permission for the controlled data includes setting the access permission for the controlled data based on a comparison of the elapsed access duration to the granted access duration.

8. The method of claim 7, further comprising setting the access permission for the controlled data based on a comparison of the number of granted accesses and the count of accesses.

9. The method of claim 8, further comprising:

initiating transmission of the controlled data to the processor device based on the access permission;

updating the count of accesses in response to initiating transmission of the controlled data; and updating the access permission based on the updated count.

10. The method of claim 8, further comprising:

updating the count of accesses in response to a signal from a hardware interrupt mechanism indicating access to the controlled data; and determining whether to update the authorization data based on the updated count.

11. The method of claim 7, further comprising updating the authorization data based on a signal received during a hardware boot process.

12. The method of claim 7, wherein the memory device comprises a flash memory device.

13. A computer readable storage device storing instructions executable by one or more processors to manage, at a microcontroller device integrated into a memory device, access by a processor device to data stored on the memory device, wherein the instructions cause the one or more processors to:

set an access permission for controlled data stored by the memory device based on authorization data stored in the memory device, the authorization data to indicate a number of authorized accesses to the controlled data granted to the processor device, a count of authorized accesses to the controlled data, and a granted access duration;

receive, from the processor device, a request to access the controlled data; and determine whether to initiate access to the controlled data by the processor device based on the access permission;

determine an elapsed access duration based on an indicator from a clock device indicating an elapsed time following an authorized access corresponding to the request, and prior to receipt of an access complete message corresponding to the request; and wherein the instructions cause the one or more processors to set the access permission for the controlled data also based on a comparison of the elapsed access duration to the granted access duration.

14. The computer readable storage device of claim 13, herein the instructions cause the one or more processors to set the access permission for the controlled data based on a comparison of the number of granted accesses and the count of accesses.

15. The computer readable storage device of claim 14, wherein the instructions cause the one or more processors to:

initiate transmission of the controlled data to the processor device based on the access permission;

update the count of accesses in response to initiating transmission of the controlled data; and update the access permission based on the updated count.

16. The computer readable storage device of claim 14, wherein the instructions cause the one or more processors to:
  update the count of accesses in response to a signal received from a hardware interrupt mechanism indicating access to the controlled data; and
  update the access permission based on the updated count.

17. The computer readable storage device of claim 13, wherein the instructions are further executable by the one or more processors to update the authorization data based on a signal received during a hardware boot process.

* * * * *